United States Patent
Look (10) Patent No.: US 10,360,556 B2
(45) Date of Patent: Jul. 23, 2019

(54) FINANCIAL CARD TRANSACTION SECURITY AND PROCESSING METHODS

(71) Applicant: Veritec, Inc., Golden Valley, MN (US)

(72) Inventor: Thomas F. Look, Ramsey, MN (US)

(73) Assignee: VERITEC INC., Golden Valley, MN (US)

( * ) Notice: Subject to any disclaimer, the term of this patent is extended or adjusted under 35 U.S.C. 154(b) by 0 days.

(21) Appl. No.: 13/946,370

(22) Filed: Jul. 19, 2013

(65) Prior Publication Data

US 2014/0025518 A1 Jan. 23, 2014

Related U.S. Application Data

(60) Provisional application No. 61/673,516, filed on Jul. 19, 2012.

(51) Int. Cl.
*G06Q 20/34* (2012.01)
*G06Q 20/02* (2012.01)
*G06Q 20/40* (2012.01)

(52) U.S. Cl.
CPC ......... *G06Q 20/347* (2013.01); *G06Q 20/027* (2013.01); *G06Q 20/341* (2013.01); *G06Q 20/354* (2013.01); *G06Q 20/405* (2013.01)

(58) Field of Classification Search
CPC .. G06Q 10/0875; G06Q 20/02; G06Q 20/023; G06Q 20/04; G06Q 20/351; G06Q 20/341; G06Q 20/20; G06Q 20/354; G06Q 20/347; G06Q 20/027; G06Q 20/405; G07F 7/0806
USPC .................................................... 705/21, 44
See application file for complete search history.

(56) References Cited

U.S. PATENT DOCUMENTS

| | | | | |
|---|---|---|---|---|
| 7,172,112 B2* | 2/2007 | Bonalle et al. | ............... | 235/379 |
| 8,480,002 B2* | 7/2013 | Poidomani et al. | .......... | 235/492 |
| 8,544,735 B2* | 10/2013 | Mestre | ................ | G06Q 20/354 235/375 |
| 8,650,121 B2* | 2/2014 | Spear | .............................. | 705/41 |
| 8,939,357 B1* | 1/2015 | Perry | ................... | G06Q 20/387 235/379 |
| 8,960,540 B2* | 2/2015 | Smets | ................. | G06Q 20/354 235/380 |
| 9,082,101 B2* | 7/2015 | Kulasooriya | ........ | G06Q 20/202 |
| 9,898,733 B1* | 2/2018 | Perry | ................... | G06Q 20/357 |
| 2005/0131815 A1* | 6/2005 | Fung | ..................... | G06Q 20/10 705/39 |
| 2005/0263588 A1* | 12/2005 | Babi | ...................... | G06Q 20/32 235/380 |
| 2006/0000900 A1* | 1/2006 | Fernandes | .............. | G06Q 20/04 235/380 |
| 2010/0063906 A1* | 3/2010 | Nelsen | ................... | G06Q 20/28 705/30 |
| 2010/0114768 A1* | 5/2010 | Duke | ................... | G06Q 20/105 705/41 |
| 2012/0136734 A1* | 5/2012 | Jain | ............................... | 705/16 |
| 2012/0203698 A1* | 8/2012 | Duncan | ................. | G06Q 20/34 705/44 |

(Continued)

*Primary Examiner* — Florian M Zeender
*Assistant Examiner* — Milena Racic
(74) *Attorney, Agent, or Firm* — Kagan Binder, PLLC (57) ABSTRACT

Methods and systems for a secure financial transaction that can be processed through open loop or closed loop networks using electronically readable or visual data that is preferably provided or integrated into a financial card to determine network selection and card authentication and verification requirements.

14 Claims, 5 Drawing Sheets

(56) References Cited

U.S. PATENT DOCUMENTS

| | | | |
|---|---|---|---|
| 2012/0205451 A1* | 8/2012 | Poidomani | G06K 19/0702 235/492 |
| 2012/0259716 A1* | 10/2012 | Rosenberger | G06Q 40/12 705/16 |
| 2012/0265682 A1* | 10/2012 | Menon | G06Q 20/20 705/44 |
| 2012/0298747 A1* | 11/2012 | Mestre | G06Q 20/354 235/380 |
| 2012/0317628 A1* | 12/2012 | Yeager | 726/5 |
| 2012/0323787 A1* | 12/2012 | Nelsen | G06Q 20/351 705/44 |
| 2014/0025518 A1* | 1/2014 | Look | G06Q 20/347 705/21 |

* cited by examiner

MAGNETIC STRIPE TRACKS #1 & #2

%B4323881234577890^JONES/FRANK G^1208101ZZZZZZZZZZZZZZZZZZZZZ365?
;4323881234577890=1208101ZZZZZZZZZZZZZZZZZZZZ365?

%B = CONTROL CHARACTERS - 4323 = BIN FINANCIAL ACCOUNT NUMBER -0 JONES = NAME
1208 V= EXPIRATION DATE - ZZZZ = DISCRETIONARY DATA - 365 = CVV SECURITY NUMBER

FINANCIAL CARD TRANSACTION SECURITY AND PROCESSING METHODS

CROSS REFERENCE TO RELATED APPLICATION

This application claims the benefit of U.S. Provisional Patent Application No. 61/673,516, filed Jul. 19, 2012 and titled "FINANCIAL CARD TRANSACTION SECURITY AND PROCESSING METHODS", which application is incorporated herein by reference in its entirety.

TECHNICAL FIELD

The present invention is directed to methods, systems and financial cards for improved transactional security and for private, closed and open loop transactional processing based upon features as provided to a financial card.

BACKGROUND OF THE INVENTION

There are major problems associated with using the traditional method of completing a financial transaction in the credit and debit card industries at the present time.

A first problem is the fraudulent use of a financial card, particularly a debit financial card. The issue is that those institutions responsible for financial card transactions would rather have a convenient, easy and short customer experience, when conducting a financial card transaction, rather than a secure transaction. This is to induce the cardholder to use the card more frequently in order for the financial network provider to receive interchange fees for the transaction, to have the use of the customer's money and to collect interest on credit transactions. The financial network providers such as Visa, MasterCard, and American Express push the responsibility for fraudulent use and monetary loss from card fraud to the bank, who issue the cards and hold the card accounts, or the processor who manages the financial transaction for the bank, or the merchant who accepts the transaction. The network providers only worry about facilitating the transactions and not the fraud costs. The consumers have convenience and quick access to money and take no risks which will encourage more uses and risky behavior. Neither the network providers nor the consumers have much concern about fraud. It is the banks, the card processor, and the merchants, who use the financial networks that are taking on all the financial risks.

A second issue is the cost of using an open loop financial network from the major network providers such as Visa, MasterCard, Discover and American Express. An interchange fee is being charged every time a financial transaction takes place between the merchant and the consumer. The merchant pays the interchange fee to the network and not the bank. The bank, its processor and merchants bear the monetary cost if a fraudulent transaction takes place. They are the parties that assume the financial responsibilities for any fraud occurred within the financial card transaction system.

A solution to minimize fraud is to have the cardholder prove his or her right to use or ownership of the card, using digital secured data or bio-identification methods, when conducting a financial card transaction. A solution to minimize the high interchange fees for conducting a financial card transaction is to bypass the major open loop networks and switch the card, for some transactions, to a private or commercial closed loop network for POS devices residing within merchant groups.

Regarding the issue of fraudulent usage, a processing software application has been developed that can interrupt a financial card transaction by allowing a card processor or a consumer to toggle a financial card between on or off positions by using the internet, a home phone, a mobile phone or a computer. The on position corresponds to a financial card that is enabled to conduct a financial transaction, while the off position corresponds to a disabled financial card that will not be then approved to conduct a financial transaction. The same software application can also notify the card holder, via SMS text to the card holder's mobile phone or via email, of any transaction either conducted or attempted. A fraudulent financial card transaction is, however, possible if the card is in the thief's hand while in the on or enabled mode regardless if the card is forged or stolen. A transaction can be allowed to go through if the merchant does not check the holder's identification or a debit card transaction could be completed using the credit card function.

Regarding the issue of high interchange fees, a processing software platform has also been developed, as based upon the above-noted processing software application, so as to work with a merchant card processor to build a switch at a merchant point-of-sale (POS) system to channel a financial transaction to a private or a commercial network within the merchant stores and not to use a major open loop network, as such are well known and include high interchange fees. The issue is how to build a closed loop system that can reroute some merchant transactions and allow other transactions to go through the open loop networks to complete the transaction.

SUMMARY OF THE PRESENT INVENTION

The present invention is directed to methods and systems for reducing fraudulent transactions and for avoiding high interchange fees that are associated with open loop financial transactional networks.

In one aspect of the present invention, methods and systems of reducing fraudulent usage can be based upon the use of software as discussed above within the Background section for turning a financial card on or off from other devices. Specifically, such software can be set to automatically turn a financial card that is in the on or enabled mode to the off or disabled mode every time the card's magnetic stripe is scanned, such as by a merchant, and found to be in the on or enabled mode. This can then force a card holder identification and authentication to take place. In order to finish the financial transaction, the card holder could then be required to turn on and thus enable the card and thereby confirming the card's ownership and authenticating or verifying the card holder. The means of turning on the card can be accomplished by a variety of methods.

In another aspect of the present invention, methods and systems are also directed to transactions that are made without a card actually being present. In the case where a financial card account number and card expiration date are manually entered or otherwise entered into a POS terminal, the card can be turned off awaiting a card holder authentication or verification means as noted above before turning on the card and allowing the financial transaction to be completed. Also in accordance with the present invention is an allowance for determining a level or condition that can trigger turning off a card. Circumstances such as a low value transaction, certain types of purchases, card holders that have a history of careful card use or any other criteria suitable to the bank and/or processor can be determined to void the need of turning off the card before completing the transaction or even with a card that has been turned off allowing the transaction to be completed.

In another aspect of the present invention, methods and systems allow for switching a financial card transaction at a POS device from an open loop network to a less costly private or commercial closed loop network. When a consumer uses a Visa, Discover, MasterCard, or American Express financial card, that is sponsored by a merchant group, within the merchant's store, a transaction can go through a merchant's private or a commercial closed network instead of an open network. For example, a merchant group can thus lower their interchange cost by sponsoring a financial card issued by an issuing bank and that can be processed by a processing software platform as noted above. The financial card can be a private label, Visa, MasterCard, Discover or American Express card, as are known. A processing software platform can hook to the merchant group's own POS device network to build a private or commercial network route that sends the transaction through the merchant's closed loop transaction network within the merchant group stores. The means of switching between an open loop and private or commercial closed loop can be accomplished by a variety of methods and systems.

As used throughout this specification, the following terms are defined as follows:
1. Financial card or card—A plastic card, such as a credit, debit, reloadable or gift card used to conduct financial transactions.
2. Financial transaction or financial card transaction or transaction—The payment for goods and/or services or other financial exchanges using a financial card or any other means that represent a financial card.
3. Financial network or financial network provider—An association of entities providing the services that facilitate financial card transactions.
4. Open loop financial network—A financial network, such as Visa, MasterCard, American Express and Discover network, that supplies wide spread financial card transaction coverage to many different, intermixed, banks and merchants.
5. Closed loop financial network—A financial network that supplies financial card transaction coverage to specific banks and merchant groups or large retailers.
6. Private or commercial closed loop network:
   a. Private closed loop network—A financial network that normally services a single merchant, merchant group or large retailer
   b. Commercial closed loop network—A financial network that normally services many merchant groups or large retailers as a business.
7. Interchange fee—The fee charged by financial networks for providing the services used in conducting financial transactions.
8. Card-not-present transaction—A financial card transaction where the card is not physically present.
9. Advanced card—A financial card that utilizes a processor software platform in accordance with the present invention.
10. Advanced network—A financial network that utilizes a processor software platform in accordance with the present invention.
11. Legacy card—Any open loop financial card that does not utilize a processor software platform in accordance with the present invention.
12. Cardholder or consumers—cardholder/consumer is an authorized user of a credit or debit card.
13. Card issuer—card issuers are financial institutions that are members of Visa and MasterCard or other networks. Banks issue payment cards under brands of these two card associations and others and contract with their cardholders for the terms of the repayment of transactions.
14. Acquiring bank—Acquiring banks (also called acquirers, processing banks or merchant banks) are financial institutions, former members of Visa and MasterCard networks, that contract with merchants to enable them to accept debit and credit card payments for their products and services. They can also contract with third parties to provide some of these services.
15. Payment processor or processor—Payment processor is an organization that has contracted with an acquiring bank to provide merchants with card payment processing services on behalf of the acquirer. Payment processors must be registered with Visa and MasterCard and must identify on all of their marketing materials, including their websites, the name of their bank partner in order to accept Visa or MasterCard branded cards.
16. Merchant—Merchant is a business or a non-profit organization that has contracted with an acquiring bank or a merchant processor to accept card payments.
17. Credit card Associations—The credit card Associations of Visa and MasterCard were formerly member-owned associations of banks that govern the issuing of Visa and MasterCard cards and the acquiring of Visa and MasterCard card transactions. Both organizations have developed payment systems to facilitate the processing of transactions between member banks.
18. Service provider—A service provider can be any third party that provides a service used in the card payment transaction process, point-of-sale (POS) terminals, payment gateways, web hosting, SSL certificates, shopping carts, etc.
19. Authorization—Authorization is the process by which the card issuer approves or declines a card transaction.
20. Authentication—Authentication is the process of establishing the validity of the credit or debit card account information provided by the customer. Authentication is done by utilizing various fraud prevention tools, including Address Verification Service (AVS) and card Security Codes (CVV2, CVC 2 and CID). It may also be done at the point of sale via documentation or biometric identifier(s) checks.
21. Clearing—Clearing is a process through which a card issuer exchanges transaction information with a processing bank. Clearing and settlement occur simultaneously.
22. Capture—Capture is the process of collecting and organizing information of credit and debit card transactions for submission for settlement.
23. Settlement—Settlement is a process through which a card issuing bank exchanges funds with a processing bank to complete a cleared transaction.

BRIEF DESCRIPTION OF THE DRAWINGS

FIGS. 2A, B, C, D, and E are plan views of financial transaction cards of the present invention showing variations as to the type of card, FIG. 2A shows a major retailer and national network dual branded card, FIG. 2B shows a merchant group and national network dual branded card, FIG. 2C shows a major retailer and advanced card of the present invention dual branded card, FIG. 2D shows a merchant group and advanced card of the present invention dual branded card, and FIG. 2E shows a merchant program and advanced card of the present invention dual branded card.

DETAILED DESCRIPTION OF THE INVENTION

Methods and systems in accordance with one aspect of the present invention can change a financial card that is in an enabled or "on" mode to a disabled or "off" mode every time the card's magnetic stripe is scanned and found to be in the on mode. By doing this, card holder identification and authentication steps can then take place. In order to finish a financial transaction of this type, the card holder must turn on the card by confirming its ownership and authenticating or verifying the card holder.

Means of turning on and enabling the card can be accomplished by a variety of methods. The card holder could use their mobile phone to turn the card on, as discussed above in the Background section by utilizing developed software having this capability, to complete the financial transaction. The card holder could enter a PIN number into a POS device key pad which, when verified, would turn on the card to complete the financial transaction. The card holder's live fingerprint could be scanned and compared to fingerprint minutia held in a two dimensional bar code on the card or stored in a database held by the processor which, when verified, would turn on the card to complete the financial transaction. The card holder's live facial image could be visually compared to a displayed graphic facial image held in a two dimensional code on the card or stored in a database held by the processor which when verified by the transaction clerk would turn on the card to complete the financial transaction. The card holder's driver's license magnetic stripe could be scanned or the last four digits of the driver's license number could be used to verify the card holder and turn on the card to complete the financial transaction. Other methods of biometric identification, entering of data only known to the card holder, visually identifying features of the card holder or other suitable methods of authenticating or verifying the card could be used to turn on the card and complete the financial transaction within the scope of the present invention.

Within the scope of this innovative process is a similar means for card-not-present transactions. Where a financial card account number and card expiration date are manually or otherwise entered into a POS terminal, the card can be turned off awaiting a card holder authentication or verification means as noted above before turning on the card and allowing the financial transaction to be completed. Also within the scope of the present invention is an allowance for determining a level or condition that triggers turning off the card. Circumstances such as a low value transaction, certain types of purchases, card holders that have a history of careful card use or any other criteria suitable to the bank and/or processor can be determined to void the need of turning off the card before completing the transaction or even with a card that has been turned off allowing the transaction to be completed.

Methods and systems of the present invention also include those that can switch a financial card transaction at a POS device from an open loop network to a less costly private or commercial closed loop network. When the consumer uses a Visa, Discover, MasterCard, or American Express, that is sponsored by a merchant group and within the merchant's store, a transaction can go through the merchant's private or another closed commercial network instead of the open network. For example, a merchant group can lower their interchange cost by sponsoring a financial card that is issued by an issuing bank and that can be processed by such issuing bank's processing software platform. Such an issuing bank and processing service is commercially available from Veritec Inc., of Golden Valley, Minn., the assignee of the subject invention. Such a financial card can be a private label, Visa, MasterCard, Discover or American Express type card. A processing software platform, such as could be utilized as services available from Veritec, Inc., can hook to a merchant group's own POS device network to build a private or commercial network route that sends the transaction through the merchant's closed loop transaction network within the merchant group stores.

The means of switching between an open loop and private or commercial closed loop can be accomplished by a variety of methods of which examples are given as follows.

Using a co-branded, open loop network such as a Visa network and merchant group card network, a merchant group's individual POS devices can selectively route card financial transactions to a private network whereas all other merchant financial card transactions can still be routed through the open loop network using legacy methods. An open loop network card account PAN number or discretionary data, as can be read from a magnetic stripe or other electronically readable media on the card, can direct the merchant group POS to select a particular network routing.

Using a co-branded, open loop network such as a Visa network and merchant group card network, the merchant group's individual POS Devices can route card financial transactions to a commercial network whereas all other merchant financial card transactions can still be routed through the open loop network using legacy methods. Also, an open loop network card account PAN number or discretionary data, as can be read from a magnetic stripe or other electronically readable media on the card, can direct the merchant group POS to select a particular network routing.

Using an open loop network card issued by a bank with a platform for financial card processing back end, such as discussed above and available from Veritec, Inc., a merchant group's POS Device can route financial transactions through a private or commercial network directly to such bank's financial card processing back end according to the card PAN number or discretionary data as can be read from the card's magnetic stripe or other electronically readable media on the card. All other merchant financial card transactions can otherwise be routed through the open loop network to such bank's financial card processing back end using legacy methods.

Using a commercial closed loop network card issued by a bank with a platform for financial card processing back end, such as discussed above and available from Veritec, Inc., a merchant group's POS Device can route financial transactions through a private or commercial network directly to such bank's financial card processing back end according to the card PAN number or discretionary data as can be read from the card's magnetic stripe or other electronically readable media on the card. All other merchant financial card transactions can otherwise be routed through an open loop or commercial closed loop network to such bank's or other similar financial card processing back end using legacy methods.

Using any of the above dual branded open loop network and merchant group cards, open or commercial closed loop network cards issued by a bank with financial card processing back end in an ATM device, where the ATM device is part of a bank ATM group, the ATM device can route financial transactions through a private or commercial network directly to such bank's or other similar financial card processing back end according to the card PAN number or discretionary data as can be read from the card's magnetic stripe or other electronically readable media on the card. All other ATM financial card transactions can otherwise be routed through the current open loop or commercial closed loop network to such bank's or other similar financial card processing back end using legacy methods.

In each case the card is dual purpose in that the open or closed loop network chosen to conduct the transaction can be selected by means of an application running on the POS device which monitors the PAN number or discretionary data as can be read from a financial card's magnetic stripe or other electronically readable media on the card. Normally if the card presented for payment is not part of a merchant group card program, the financial transaction will be conducted through the open loop network. Otherwise, merchant group cards can instead use a private or commercial closed loop network where the financial transaction costs can be lower and may have additional beneficial features including those that the merchant group can offer to the card holder such as rewards or discount points.

A card issued by a bank/processor that conforms to the systems, processes or methods of the present invention, as described herein, will be referred to as an advanced card hereafter. All other financial cards will be known as a legacy card hereafter.

The present invention in some aspects comprises methods and systems for a secure financial transaction that can be processed through open loop or closed loop networks using electronically readable or visual data that is preferably provided or integrated into a financial card to determine network selection and card authentication and verification requirements.

While legacy financial card transactions are not very secure and often are fraudulent and the process of conducting the transaction is costly and under the control of a few major network providers such as Visa, MasterCard, American Express and Discover, the advanced financial card, methods, and systems of the present increases security to transaction, reduces transaction costs and at the same time offers the card holding customer and the merchant additional features without diminished capacity for broad use at other retail merchants, ATMs and international locations. An understanding of financial card transactions follows from which transactions of the present invention can be more clearly understood.

Financial cards come in a number of variations, some of which are described as follows. A credit card is a financial card associated with a credit card account that are issued by a bank to an individual that allows that individual to make purchases or receive cash advances from funds that the bank will loan to the individual. A debit, checking or ATM card can also be a financial card that is issued by a bank and that is tied to a card holder's account in the bank where the card holder makes purchases or receive cash advances from funds held in their bank account. A reloadable card is also a financial card that can be issued by a bank where the card holder does not necessarily have an account in the bank but does have the ability to load funds to their card and make purchases or receive cash advances from funds held in their card account. While the funds can be held in the bank, the account may be managed and administered by a non-banking business. A gift card is a financial card that can be issued by a bank or business with funds loaded one time and where the gift card recipient will normally use the gift card to make purchases in the business that furnished the gift card or at different merchants if the gift card is issued by a bank. Normally gift cards cannot be used for cash withdraws.

The above card type description set out the general aspects of each card type and the differences between cards. Credit cards are only issued to credit worthy people that the bank believes will pay back to the bank the funds loaned for purchases and cash withdraws. The debit card has funds already in the bank that can be used to make purchases and cash withdraws so there should be a minimum risk. The reloadable card is normally used by people that do not qualify for a bank account but would like a financial card to make purchases, make cash withdraws or transfer money to other individuals. Gift cards are, as the name states, normally used for gifts to others but in some cases are used as a method of transferring funds to a relative or others rather than using a funds transfer service.

Financial cards are used to make purchases, receive cash withdraws, load funds to the card account, transfer funds to other people and accounts and for other financial purposes. Financial card purchases can made, as examples, at brick and mortar merchants, online purchases over the internet, phone purchases using land line and mobile devices, and mobile merchants that use card readers attached to mobile phones and other methods. In addition to visiting a bank branch office, ATMs are the normal method of making cash withdraws while some merchants allow a little cash back during purchases. Funds can be loaded to a card account using programs such as Visa Ready Link, sending a check, money order, money gram or the like to a card issuer or processor. Funds in a financial card account can also be transferred to another financial card, a different financial account either belonging to the card holder or belonging to other people, and so as to pay bills and make other payments.

In most card financial transactions, an electronic device is used to read a magnetic stripe as are typically provided on a surface of a financial card. Such an electronic device or POS system also typically allows input from the merchant and/or card holder via a keypad, touch screen or similar methods and also can electronically communicate with a financial transaction processor via phone land lines, mobile communications and internet driven access. POS devices are typically utilized for merchant sales, while ATM are utilized for cash withdrawals. Loading and transferring funds most often uses mobile phones, land lines, internet and wired or mailed transfers.

Figure 1:
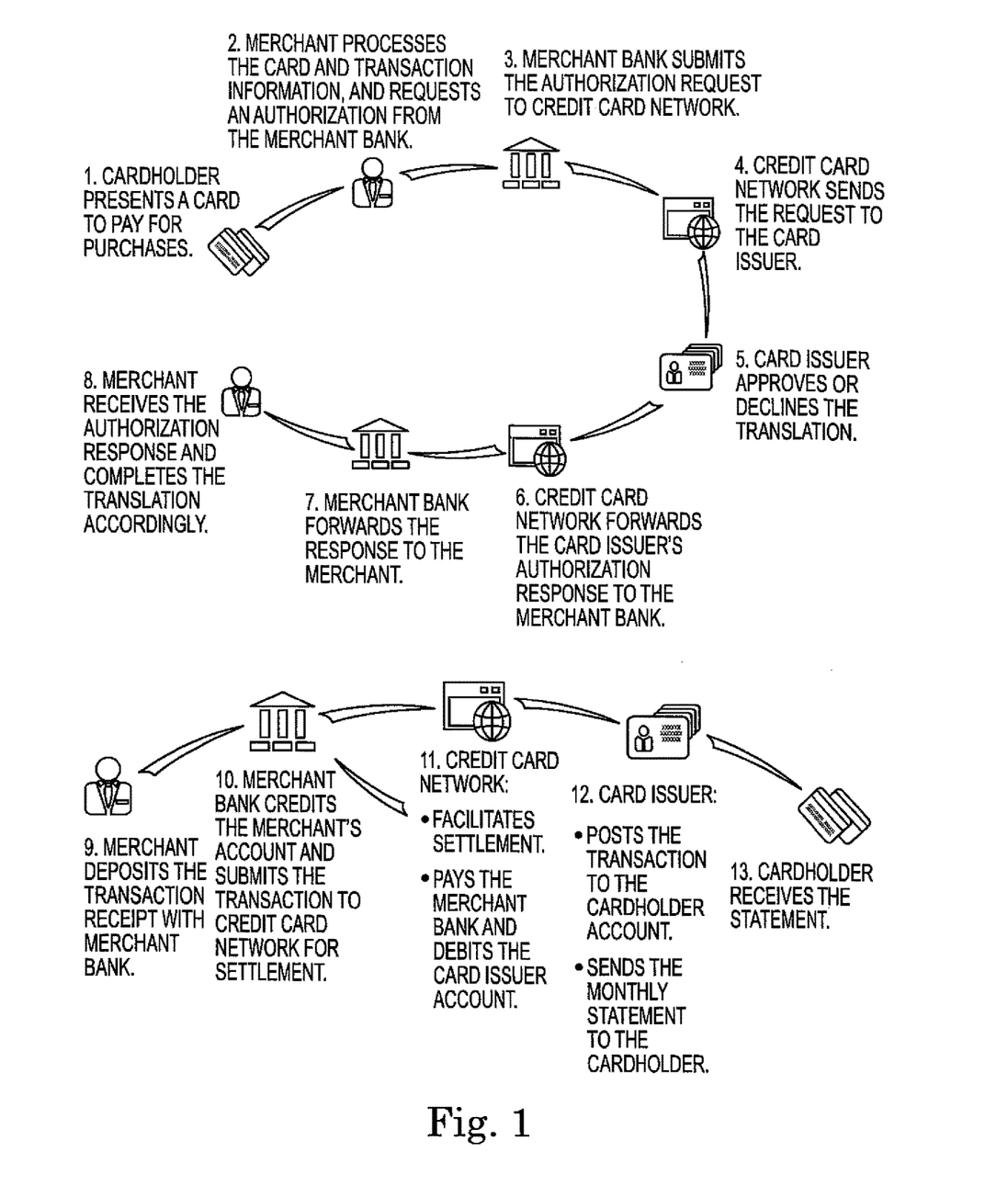
FIG. 1 is a schematic illustration of a financial transaction including an authorization process followed by a clearing and settlement process.
Figure 2A:
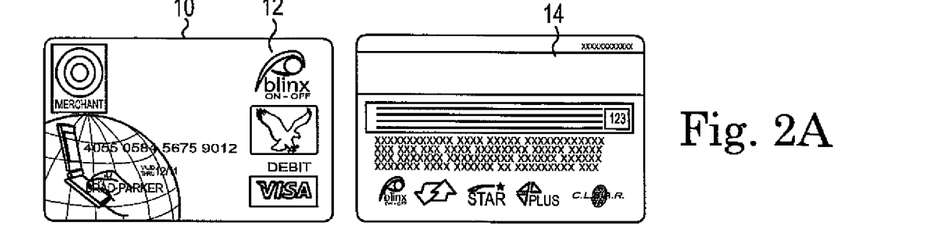
Figure 2B:
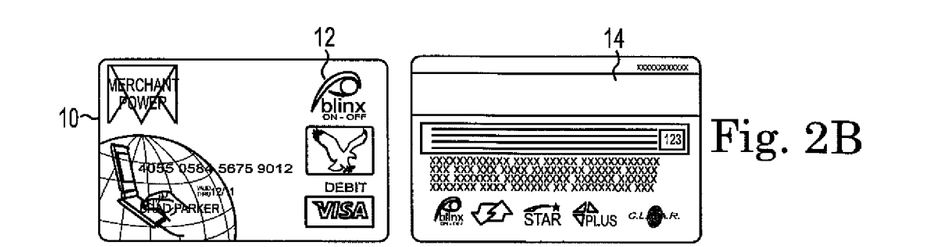
Figure 2C:
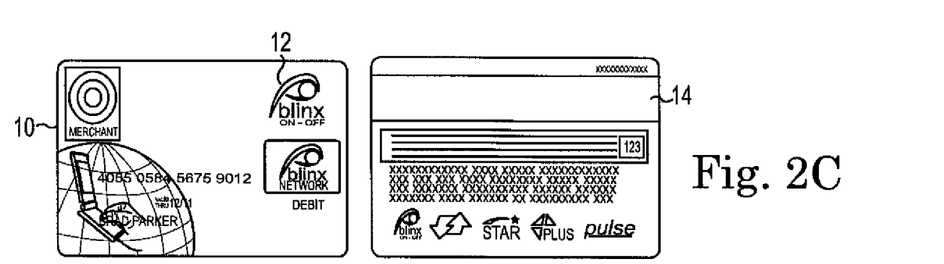
Figure 2D:
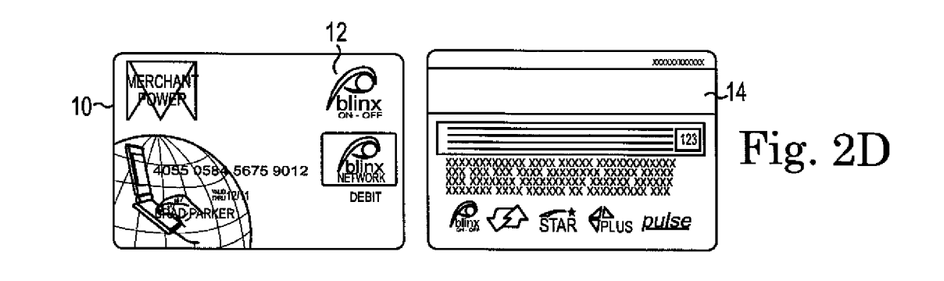
Figure 2E:
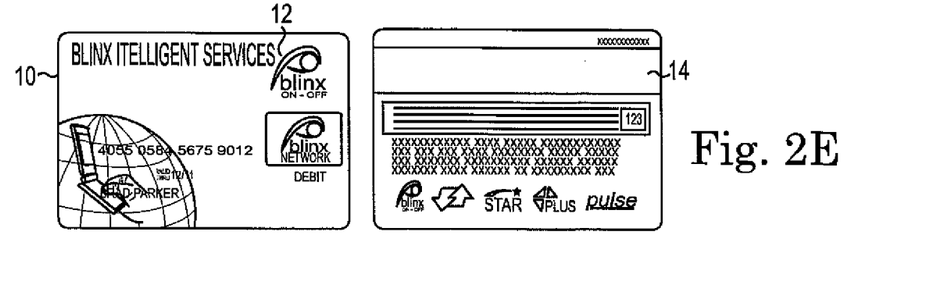

A full transaction cycle is represented in the schematic diagram of FIG. 1. As can be seen in FIG. 1, the presentation of a financial card to payment for any goods or services requires the involvement of a number of institutions prior to any approval for the purchase. Typically, a merchant starts the processing of the transaction, step 2, and requests authorization from a merchant, which merchant bank sends a request to a credit card network, step 3. The credit card network send a request then to the card issuer, such as an issuing bank that is a member to the credit card network, step 4. Steps 5-8 are a reversal of the initial process relaying an authorization or denial as relevant to the transaction at hand. Steps 9-13 comprise a typically manner by which the money of the transaction is actually transferred and credited to a merchant and how a cardholder is eventually debited and charged for the transaction to be paid by the cardholder pursuant to a statement.

The foregoing describes a legacy financial card purchase where transaction settlement uses a method knows as the ACH method. ACH is an electronic network for financial transactions in the United States. ACH processes large volumes of credit and debit transactions in batches, normally processed overnight, which means that fraudulent transactions may not be caught until 24 hours later. If the transaction is not obviously fraudulent, the consumer may not notice the fraud and contact their card issuer until the next monthly statement is read and reviewed, resulting in weeks or even months passing before the problem is identified and addressed.

Figure 3:
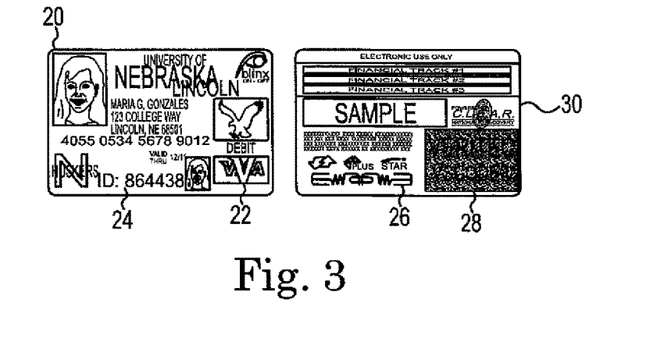
FIG. 3 is a view of front and back card sides with multiple electronically readable means provided.

An innovative advanced financial card of the present invention advantageously can use the same basic format as legacy financial cards but with option of using two or more different financial processing networks. Note that while each card 10 shown in FIGS. 2A-E are shown with dual branding visually on the card, any card graphics are within the scope of the invention. For purposes of illustration, the term "blinx" and related logo with the on/off notation as shown at 12 are provided on a surface of the card as a notation of an advanced financial card in accordance with the present invention. Note also that the card is shown with a legacy magnetic stripe 14 as a source of electronically readable data. It is however contemplated that any manner of providing electronically readable data, such as OCR text, RFID Transponder, Veritec and/or VSCode® two dimensional bar codes, and 3 track magnetic stripes are within the scope of the invention as shown in the card below. FIG. 3 illustrates another financial card version 20 that includes a financial card network indication at 22, an example of OCR type text 24 that can include relevant transactional data including an indication of open or closed network usage and that be electronically read by conventional OCR readers, an RFID responder 26 that can likewise include relevant transactional and network type data, and a two dimensional bar code 28 as may include financial transactional data, network type processing data, and other data as may be provided for enhanced security such as biometric information and the like. On the rear side surface of the card 20, a magnetic stripe 30 is illustrated as comprising three distinct tracks as is conventional in card magnetic card design presently. Each of the OCR text, RFID transponder, the two dimensional bar code, and the magnetic stripe can provide the necessary data in accordance with the present invention for controlling a network selection as electronically readable data.

Note also that the shown cards are debit cards but any financial card such as credit, debit, reloadable or gift card and any other type financial card, such as a combined identification and financial card are all within the scope of this invention.

A distinguishing feature of an innovative new financial card is that the card can have electronically readable data that can be used to determine the financial network to be used to process a financial transaction and requirements for the identification and verification of the card holder. For the situation where a card is not presented for electronic reading in order to conduct a financial card transaction, visual data on the card could be used to both determine the financial network to be used to process a financial transaction and the requirements for the identification and verification of the card holder.

Figure 4:
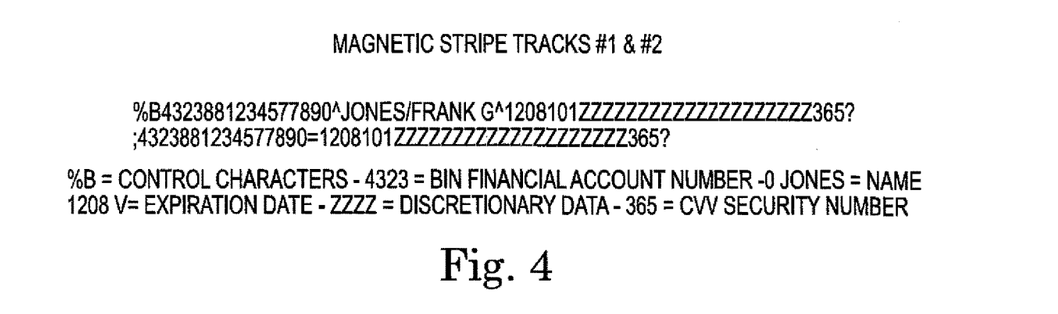
FIG. 4 is an illustration of multiple data tracks as can be provided on a magnetic strip of a financial card of the present invention.

For example, a magnetic stripe, as illustrated within FIG. 4 typically includes the following data:
Track 1, Format B:
Start sentinel—one character (generally '%')
Format code—"B"—one character (alpha only)
Primary account number (PAN)—up to 19 characters. Usually, but not always, matches the credit card number printed on the front of the card.
Field Separator—one character (generally '^')
Name—two to 26 characters
Field Separator—one character (generally '^')
Expiration date—four characters in the form YYMM.
Service code—three characters
Discretionary data—may include Pin Verification Key Indicator (PVKI, 1 character), PIN Verification Value (PVV, 4 characters), card Verification Value or Card Verification Code (CVV or CVK, 3 characters)
End sentinel—one character (generally '?')
Longitudinal redundancy check (LRC)—it is one character and a validity character calculated from other data on the track. Most reader devices do not return this value when the card is swiped to the presentation layer, and use it only to verify the input internally to the reader.
Track 2: This format was developed by the banking industry (ABA). This track is written with a 5-bit scheme (4 data bits+1 parity), which allows for sixteen possible characters, which are the numbers 0-9, plus the six characters : ; < = > ?. The selection of six punctuation symbols may seem odd, but in fact the sixteen codes simply map to the ASCII range 0x30 through 0x3f, which defines ten digit characters plus those six symbols. The data format is as follows:
Start sentinel—one character (generally ';')
Primary account number (PAN)—up to 19 characters. Usually, but not always, matches the credit card number printed on the front of the card.
Separator—one char (generally '=')
Expiration date—four characters in the form YYMM.
Service code—three digits. The first digit specifies the interchange rules, the second specifies authorization processing and the third specifies the range of services
Discretionary data—as in track one
End sentinel—one character (generally '?')
Longitudinal redundancy check (LRC)—it is one character and a validity character calculated from other data on the track. Most reader devices do not return this value when the card is swiped to the presentation layer, and use it only to verify the input internally to the reader.

Note that both Track #1 and Track #2 have optional sections noted as Discretionary Data, denoted as "ZZZ" where additional account numbers, data denoting options or provided services or any other data that allows software applications to be directed to providing features and benefits to the card holder and merchant. Note that the PAN number or any other legacy data could also be part of the data used in methods and systems of the present invention.

Figure 5:
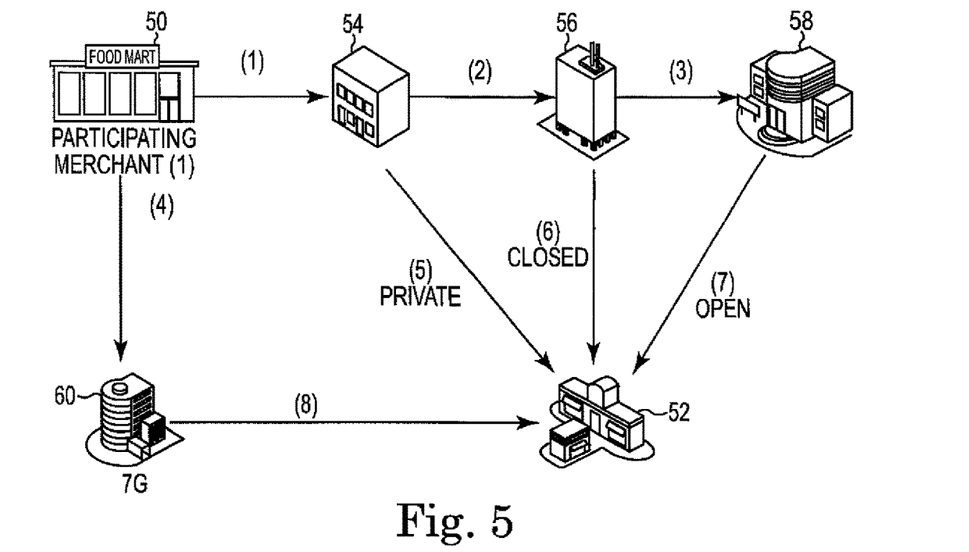
FIG. 5 is a schematic illustration of a private loop process, a closed loop process, and an open loop process of the present invention.
Figure 6:
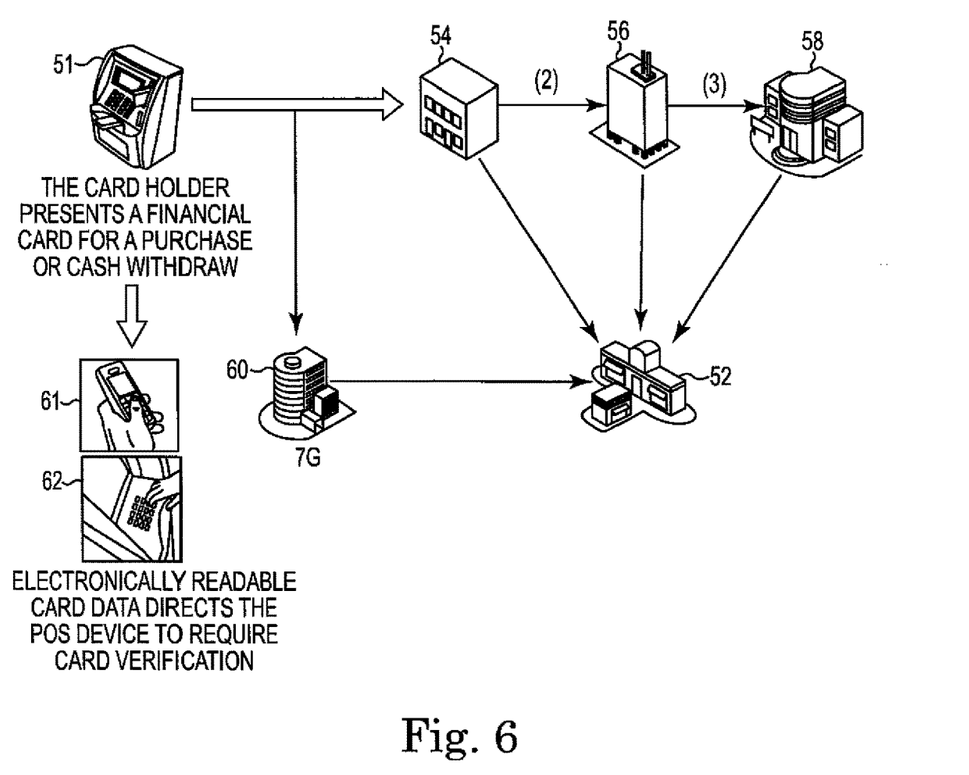
FIG. 6 is a schematic illustration similar to FIG. 5, also showing security feature steps in accordance with an aspect of the present invention.

With reference to FIGS. 5 and 6, various payment solutions are illustrated as will be discussed in greater detail below. According to the present invention a preferred payment solution is closed-loop in order to allow for quick funds transfer, to minimize transaction expenses, including interchange charges, and to support value-added transactions such as loyalty, P2P, B2C, Payroll and Commissions disbursements, and the like.

In a purchase, for example, a consumer's authorization request (using an advanced card to make a purchase) could travel from a merchant 50, such as a market, to an issuing bank 52 along a number of different paths as are illustrated. Included in the schematic illustration are also a private service provider 54, a public service provider 56, and a network service provider 58, such as could comprise a network provider like Visa, Mastercard, or the like.

As shown, the various steps that can be taken for a given transaction are noted on the FIG. 5 schematic. Following different paths between the merchant 50 and card issuer 52 represent different types of transaction methods. The path along arrows 1 and 5 represent a fully private transaction. Such a private transaction can follow any protocol developed between the merchant 50 and card issuer 52 with preferably only a private service provider 54 involved in the loop to simplify the process. An example of a private service provider that can facilitate private payments and charged in accordance with the aspect of the present invention is Meritus Payment Solutions Inc. of Orange, Calif. Such a private loop transaction would be least expensive and most flexible. As between the merchant 50, the card issuer 52, and a private service provider 54, processes for charging and settlement can be set up as needed. Such a private network is limited to the scope of the specific members, which advantageously allows for customization and changes.

A transactional path represented along arrows 1, 2, and 6 represents a closed-loop solution. This loop is similar to that described just above but with the addition of a second service provider 56 that is a preferably a national service provider that handles card sales processing including the ability to process transactions with network providers 58. An example of a national service provider in accordance with this aspect of the present invention is First Data Corporation. However, by processing a financial transaction without the network provider 58, and instead dealing with the card issuer 52 directly, a closed loop transaction is created. This type of transaction is less flexible but takes advantage of established reporting and settlement solutions that are in place.

A transactional path represented along arrows 1, 2, 3, and 7 represents an open-loop solution, which is essentially the manner by which transactions are handled at present. Such an open loop path allows for global connectivity and is based upon well established protocols for charging, reporting and settlement. It is however the most expensive alternative.

The path 4, 8 is noted as a contemplated alternative manner. This path represents other developing transactional paths that may be web-based solutions for charging and settling transactions privately including such a service provider 60. Transactions along the arrows 1, 2, 3, 5, 6 and 7 are ISO-8583 compliant. Transactions along arrows 4 and 8 would preferably be delivered via browser and web-services.

FIG. 6 represents a similar schematic of financial transactions as in FIG. 5, but also includes as aspect of the present invention including a security feature as discussed above. As shown at 51, a card holder can present a card for a transaction or a money withdrawal at an ATM. As above, when the card is swiped, the card is switched to an off or disabled mode. Steps 61 and 62 represent the steps a card holder might take to enable or turn on the card. For example, a mobile phone could be used to message or utilize a card application to enable the card as shown at 61. Or, the card holder might be required to enter a private code as shown at 62 to enable the card. Such security processes can be done along with any of the alternatives for financial transactions as discussed above with reference to FIG. 5.

A store front (also sometimes referred to as Point of Purchase (POP) or checkout) is the location where a transaction occurs. A "checkout" refers to a POS terminal, POS device or more generally to the hardware and software used for checkouts, the equivalent of an electronic cash register. A financial card transaction starts by reading electronically readable data on the card. As noted above, data can be read from the card using many different electronically readable data means such as OCR text, RFID Transponder, Veritec VSCode® and/or 3 track magnetic stripe. Normally the data is read from the first two tracks of the magnetic stripe, which contains the data as denoted in the magnetic stripe diagrams above. In order to read the magnetic stripe or any electronically readable data, a device is required that queries the electronically readable data and electronically returns said data in a form that can be utilized by a computational method such as used in a POS device. The inventive method will be coded in or part of the software/firmware found in the POS device/s. That is to say that the point of sale initialization for the processes, applications, features and benefits of the present invention and for the methods of the present invention are implemented in software and hardware as part of the POS system. It is within the scope of this invention to use legacy POS devices, without any changes to the hardware or software, where the merchant bank, could use the advanced network of the present invention. Card data can be read from the merchant's POS system to determine the routing of the financial transaction to a closed loop or open loop network.

Figure 7:
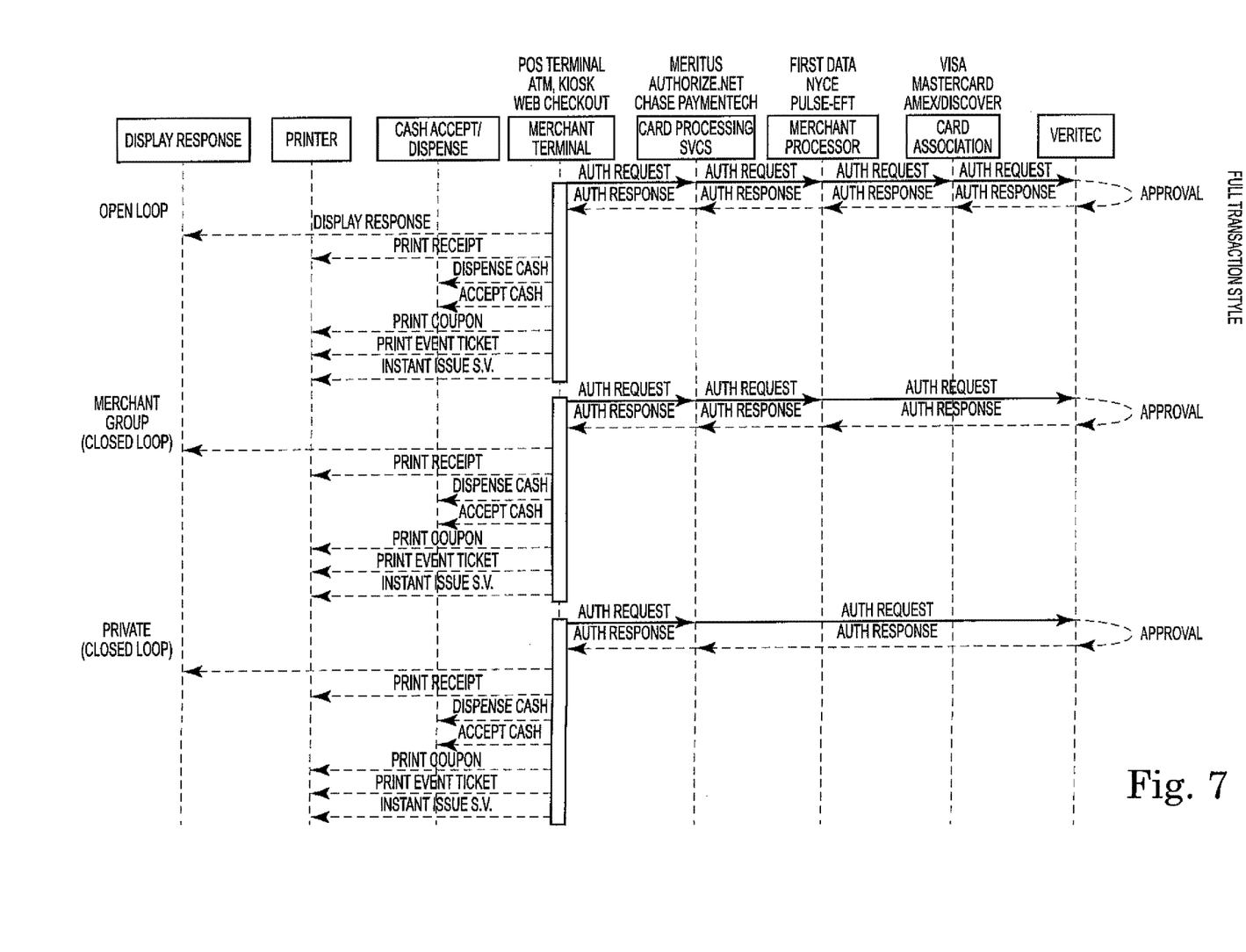
FIG. 7 is a routing diagram of full transactional cycles in accordance with the present invention.

If the card has a PAN number that identifies the bank/processor as a card within a group of bank/processors cards that support the inventive process discussed here within, such as an advanced card of the present invention, the security measures required for the transaction and the routing of the transaction will be determined by the PAN number and/or additional data found in one of the electronically readable means on the card. Example routing schemes are shown in FIG. 7.

If the PAN number that identifies the bank/processor as a card within a group of bank/processors cards that do not support the inventive process discussed here within, such as a legacy card, the financial card transaction will be routed through the open loop network as discussed in the legacy full transaction cycle diagram in FIG. 1.

If the card is an advanced card of the present invention type, then the assumption is that the card is closed to financial transactions until the card holder verifies or authenticates their right to use the card. The card holder can close the card by using the off method, the card can be set to close after each financial transaction or if the card has been open for more than a designated period of time since the last transaction, the card can be closed by the processor when a transaction is attempted. In order to implement the transaction the card holder must verify or authenticate their right to conduct a financial transaction using the card by a means of turning on the card as discussed above. For example, after a verification is received from the card user, the status of the financial card is changed to an on position followed by a processing of the financial transaction by way of a private network. Within the scope of the present invention is an allowance for determining a level or condition that triggers turning off the card. Circumstances such as a low value transaction, certain types of purchases, card holders that have a history of careful card use or any other criteria suitable to the merchant, bank and/or processor can be determined to void the need of turning off the card before completing the transaction or even with a card that has been turned off, allowing the transaction to be completed.

If the card is an advanced card of the present invention type then the POS device, or perhaps the merchant bank will determine a network to be used for the transaction. As examples, card financial transaction processing network methods include various different networking methods that could be utilized for a given financial transaction; private closed loop network, commercial closed loop network and open loop network. A private closed loop network could be used for a large retailer where they normally would have a company card but would like a card that would be used at other merchants as an open loop card. The commercial closed loop network would be better suited for a merchant group where there is a diversity of needs within the group, but the lower cost per transaction of the closed loop network and the advantages of having a card that works at most all other merchants using the open loop network is prevalent. The open loop network covers all merchants outside of the closed loop network of merchants and allows for more broad ATM and international usage. Whatever reasons a merchant may have for utilizing a type of network could be managed within the scope of this invention by providing data in the electronically readable data on the card that would determine which network is to be use for a transaction. All normal legacy cards would be readable in the inventive POS system and all advanced cards of the present invention would be readable in the legacy card POS systems.

Advanced cards of the present invention could be used as a reloadable card where at merchant group stores participating in the inventive advanced network, the merchant would accept payment to be loaded into the card holder's advanced card account. For example, the load could be sent through a private network to the advanced network processor who would debit the merchants account and credit the advanced card account. The advanced card PAN number or other electronically readable data on the card could be used to identify the advanced card account and the merchant identification could be transmitted from the merchant's POS system as part of the sent message as well as the monetary value being loaded.

Advanced cards could be used as an ATM or check card where at merchant group stores participating in the inventive advanced network, the merchant would provide cash to the advanced card holder. For example, the ATM style transaction could be sent through a private network to the advanced network processor who would credit the merchants account and debit the advanced card account. The advanced card PAN number or other electronically readable data on the card could be used to identify the advanced card account and the merchant identification could be transmitted from the merchant's POS system as part of the sent message as well as the monetary value being given to the card holder.

Advanced cards could be used as a loyalty card. The advanced card PAN number or other electronically readable data on the card would identify the card holder's participation in a loyalty program at a particular retailer or a group of merchants, For example, when the card is used at a merchant that is part of the advanced card loyalty program, the advanced network processor would record reward points for the card holder's advanced card account during the processing of a financial transaction. A second feature could be a percentage of the financial card transaction would be debited from the merchant's account and credited to the card holder's account as an immediate cash reward. Product discounts, coupons with percentage or dollar amount, total sale percentage discount based on hitting target numbers or any other loyally reward could be handled by the advanced network processor by debiting and crediting accounts or providing loyalty award products. The buying data of the advanced card holder would also be a valuable resource for providing mailed, internet and mobile phone coupons and advertising to the card holder with specific products and product locations.

An advanced card holder could participate in an advanced card product features and benefits including toggling the card ON and OFF via their mobile phone or internet access, all transaction attempts sent as a SMS message to their mobile phone, all transaction receipts sent to their mobile phone, a master advanced card account with as many subordinate cards as required all with spending limits, never a delinquency charge of any kind, account to account and card to card money transfers, Federal Deposit Insurance and many other features that are beneficial to the card holder.

By using a private or commercial closed loop network the merchant would save up to 5% of the transaction in interchange fees charged by the open loop financial card companies such as Visa, MasterCard, American Express and Discover. This is often a huge improvement to their bottom line. They will also have the advantage of loyalty programs, directed couponing and advertising to their best customers, immediate funds availability for transactions, almost 0% fraudulent card transaction loss, and participation in the advanced card.

Examples of Electronically Readable Data—In the example above "financial card Magnetic Stripes Tracks #1 and #2" we have an example of discretionary data that is allowed on a financial card magnetic stripe. The example denotes the sample data as "ZZZ". Tracks 1 and 2 are shown as having a total of 40 characters of discretionary data. Track 1 allows alpha/numeric and control characters while track 2 allows numeric and control characters. Track #3 is normally formatted as Track #1 and since it is not used for financial card data, could be entirely used for discretionary data. The type of information that could be included in the discretionary data would be:

Merchants may want to keep their own account numbering system. The normal 16 digit PAN number would be used for open loop transactions while the merchant's account number would be contained in the discretionary data and used for private or commercial closed loop transactions Characters such as alpha/numeric or control characters that would direct the POS terminal (or ATM, or website, etc) to require certain card authentication or verification procedures, route a particular transaction to the open or closed loop network based on a product description or pricing, apply discounts or other merchant directed incentives to a purchase, or any other optional feature or benefit that is part of a merchant program Characters such as alpha/numeric or control characters that would direct the processor to apply loyalty programs to the purchase, do direct purchase discounting or any other services that would be part of a merchant program The scope of this invention includes any use of characters contained in any electronically or visually readable sources of data on the card, that are not being used as the data sources for the legacy open loop transaction method but are being used for the inventive purposes described here within including the dual use of some data sets such as the PAN Often financial card transactions are implemented without the card being physically present and not available for magnetic stripe scanning or any other means of electronic card data acquisition. Examples of such transactions are sales via the internet, sales using a telephone, sales where the magnetic stripe does not read correctly or any reason where there is not the possibility of electronic card data acquisition. The inventive methods of forcing certain card authentication or verification procedures, determining a routing for open loop or private or commercial closed loop transactions or any other procedure or method that is part inventive methods described here within could be applied using visual data on the card, orally or electronically transmitted by the purchaser or merchant clerk. Such data would include all of the legacy visual data such as the card holders name, PAN, expiration date, EVV number and specific data sets added as part of the inventive method that would contain the same characters and usage found in the description above of examples of electronically readable data. Since the purchaser would need to verify their right to use the card by methods such as also discussed above, a card not present transaction can become much more secure.

An ATM (Automated Teller Machine) is another device and means of conducting a financial card transaction. While ATMs are normally used for dispensing or receiving monetary instruments such as cash, checks and the like, they are also in the scope of the inventive method of forcing certain card authentication or verification procedures, determining a routing for open loop or private or commercial closed loop transactions or any other procedure or methods that are part of the inventive methods described here within. Banks or other ATM owners could certainly benefit from safer financial transactions, lower cost interchange fees and loyalty programs. In addition the ATMs could be used for such purposes as ticket sales to various venues, issuing coupons for banking or general merchant purposes, Instant Issue S.V., merchant loyalty awards and other such uses which are a combination of the inventive methods herein.

Methods, services and systems of the present invention could be used by other financial card issuers and suppliers by the creation of a service that issuers, who are not part of the advanced network could easily implement and take advantage of the features of the advanced cards. The inventive applications could be provided to POS terminal manufacturers where they could be included as options. If a card issuer or provider were to provide the applications to such vendors including processors, then they could use it to generate either an advance card unique transaction or to include something (visually on the card or electronically generated and read data) in an otherwise normal transaction's discretionary data field as changed or added data that is transmitted as part of the financial transaction. The second part then would be to provide a gateway where merchants with their existing merchant processing could pass their transactions to the advanced network or any network with a gateway which includes the ability to identify transactions covered by this invention, and send a copy of the transaction in suitable (PCI compliant form) to either the advanced card processor for custom, such as loyalty program processing, or to the participating bank/issuer/processor for their own use. In this way, anyone could pay a small fee for access to the advanced network services and quickly expand their offerings.

Creation of a smart-phone application could take the burden of biometric (or other) authentication/verification off of the POS terminal or ATM, or website, and the like by producing a suitably short hash or fingerprint minutia that could either be manually entered into the POS terminal, ATM, or web screen for inclusion in the discretionary field (POS/ATM) or passed through the web page. The phone application could be created using commercially available platforms that allow fast and inexpensive development, and deployment (download, availability) of the new app to consumer's phones. The phones would interact with our servers for the authentication, which could then either be passed electronically, Bluetooth or other wireless, for example or manually to the POS terminal with inventive applications as described above.

The invention claimed is:

1. A method of authorizing a financial card transaction at a merchant point of sale system, comprising:
    accepting, by a merchant point of sale system, a presentation of a financial card of a financial card user, the financial card having data stored within a financial card data storage component;
    reading the data from the storage component of the financial card by a reader that is operatively connected with the merchant point of sale system and thereby receiving data within the merchant point of sale system from the data that is stored within the storage component of the financial card related to a financial card transaction, the data received including at least one character that indicates the usage of a closed loop network to process financial aspects of the transaction;
    receiving additional data from the data that is read from the storage component of the financial card by the merchant point of sale system for payment of a transaction, the received additional data being sufficient to conduct a financial transaction including the usage of an open loop network to process financial aspects of the transaction;
    utilizing software or firmware coded within the merchant point of sale system for determining from the received data to process the financial transaction by way of the closed loop network instead of the open loop network based upon the receipt of the at least one character that indicates the usage of the closed loop network;
    as a result of the step of reading the data, changing a status of the financial card from an on position, based upon the financial card status at a time of reading the data, to an off position utilizing the merchant point of sale system and the software or firmware coded within the merchant point of sale system, and then requiring a verification input at the merchant point of sale system from the financial card user; and
    after the verification input is received from the financial card user at the merchant point of sale system, changing the status of the financial card to an on position followed by a processing of the financial transaction by way of the closed loop network.

2. The method of claim 1, further comprising a step of determining at least one condition relative to the financial card transaction prior to changing the status of the financial card from an on position to an off position.

3. The system of claim 1, wherein the closed loop network is a private network.

4. The method of claim 1, wherein the data is electronically or visually readable data.

5. The method of claim 1, wherein the verification from the software or firmware coded within the merchant point of sale system is received from the financial card user via mobile phone.

6. A method of authorizing a financial card transaction at a merchant point of sale system, comprising:

accepting, by a merchant point of sale system, a presentation of a financial card of a financial card user, the financial card having data stored within a financial card data storage component;

reading the data from the storage component of the financial card by a reader that is operatively connected with the merchant point of sale system and thereby receiving data within the merchant point of sale system from the data that is stored within the storage component of the financial card related to a financial card transaction, the data received including at least one character that indicates the usage of a closed loop network to process financial aspects of the transaction;

receiving additional data from the data that is read from the storage component of the financial card by the merchant point of sale system for payment of a transaction, the received additional data being sufficient to conduct the financial card transaction including the usage of an open loop network to process financial aspects of the transaction;

utilizing software or firmware coded within the merchant point of sale system for processing the financial transaction by way of the open loop network utilizing the received additional data to complete the transaction;

as a result of the step of reading the data, changing a status of the financial card from an on position, based upon the financial card status at a time of reading the data, to an off position utilizing the merchant point of sale system and the software or firmware coded within the merchant point of sale system, and then requiring a verification input at the merchant point of sale system from the financial card user; and after the verification input is received from the financial card user at the merchant point of sale system, changing the status of the financial card to an on position followed by a processing of the financial transaction by way of the open loop network.

7. The method of claim 6, further comprising a step of determining at least one condition relative to the financial card transaction prior to changing the status of the financial card from an on position to an off position.

8. The method of claim 6, wherein the closed loop network is a private network.

9. The method of claim 6, wherein the data is electronically or visually readable data.

10. The method of claim 6, wherein the verification from the software or firmware coded within the merchant point of sale system is received from the financial card user via mobile phone.

11. A method of authorizing a financial card transaction at a merchant point of sale system, comprising:

accepting, by a merchant point of sale system, a presentation of a financial card of a financial card user, the financial card having data stored within a financial card data storage component;

reading the data from the storage component of the financial card by a reader that is operatively connected with the merchant point of sale system and thereby receiving data within the merchant point of sale system from the data that is stored within the storage component of the financial card for payment related to a financial card transaction, the received data being sufficient to conduct the financial card transaction including the usage of a network to process financial aspects of the transaction;

utilizing software or firmware coded within the merchant point of sale system, for determining from the received data, to process the financial transaction by way of the network, as a result of the step of reading the data, changing a status of the financial card from an on position, based upon the financial card status at a time of reading the data, to an off position utilizing the merchant point of sale system and the software or firmware coded within the merchant point of sale system, and then requiring a verification input at the merchant point of sale system from the financial card user; and after the verification input is received from the financial card user at the merchant point of sale system, changing the status of the financial card to an on position followed by a processing of the financial transaction by way of the network.

12. The method of claim 11, further comprising a step of determining at least one condition relative to the financial card transaction prior to changing the status of the financial card from an on position to an off position.

13. The method of claim 11, wherein the data is electronically or visually readable data.

14. The method of claim 11, wherein the verification from the software or firmware coded within the merchant point of sale system is received from the financial card user via mobile phone.

* * * * *